(12) United States Patent
Ogg

(10) Patent No.: US 6,936,208 B2
(45) Date of Patent: Aug. 30, 2005

(54) METHOD FOR CASTING A COVER ON A GOLF BALL PRECURSOR PRODUCT

(75) Inventor: Steven S. Ogg, Carlsbad, CA (US)

(73) Assignee: Callaway Golf Company, Carlsbad, CA (US)

(*) Notice: Subject to any disclaimer, the term of this patent is extended or adjusted under 35 U.S.C. 154(b) by 37 days.

(21) Appl. No.: 10/707,945

(22) Filed: Jan. 27, 2004

(65) Prior Publication Data
US 2004/0124559 A1 Jul. 1, 2004

Related U.S. Application Data

(62) Division of application No. 09/682,753, filed on Oct. 12, 2001, now Pat. No. 6,685,455.

(51) Int. Cl.$^7$ .............................................. B29C 39/10
(52) U.S. Cl. ..................... 264/275; 264/279.1; 264/254
(58) Field of Search .............................. 264/275, 279.1, 264/254

(56) References Cited

U.S. PATENT DOCUMENTS

| | | | |
|---|---|---|---|
| 548,546 A | | 10/1895 | Hillman |
| 721,462 A | | 2/1903 | Richards |
| 2,633,603 A | | 4/1953 | Huse |
| 2,787,024 A | * | 4/1957 | Smith ........................ 264/275 |
| 2,940,128 A | | 6/1960 | Bowerman et al. |
| 3,034,791 A | | 5/1962 | Gallagher |
| 3,112,521 A | | 12/1963 | Ward |
| 3,130,102 A | | 4/1964 | Watson et al. |
| 3,147,324 A | | 9/1964 | Ward |
| 3,177,280 A | | 4/1965 | Ford et al. |
| 3,979,126 A | | 9/1976 | Dusbibier |
| 3,989,568 A | | 11/1976 | Isaac |
| 4,389,365 A | | 6/1983 | Kudriavetz |
| 5,006,297 A | | 4/1991 | Brown et al. |
| 5,334,673 A | | 8/1994 | Wu |
| 5,407,341 A | | 4/1995 | Endo et al. |
| 5,494,631 A | * | 2/1996 | Oka et al. ..................... 264/161 |
| 5,554,337 A | | 9/1996 | Ihara et al. |
| 5,692,974 A | | 12/1997 | Wu et al. |
| 5,733,428 A | | 3/1998 | Calabria et al. |
| 5,824,258 A | | 10/1998 | Yamaguchi et al. |
| 5,827,466 A | | 10/1998 | Yamaguchi et al. |
| 5,885,172 A | | 3/1999 | Hebert et al. |
| 5,888,437 A | | 3/1999 | Calabria et al. |
| 5,897,884 A | | 4/1999 | Calabria et al. |
| 5,908,358 A | | 6/1999 | Wu |
| 5,947,843 A | | 9/1999 | Calabria et al. |
| 6,165,049 A | * | 12/2000 | Yamaguchi ..................... 451/6 |
| 6,168,407 B1 | | 1/2001 | Kasashima et al. |
| 6,248,974 B1 | * | 6/2001 | Wai ........................ 219/121.69 |
| 6,597,445 B2 | * | 7/2003 | Sugimoto ................. 356/237.1 |
| 6,644,948 B2 | * | 11/2003 | Mydlack et al. ............ 425/116 |
| 2002/0192321 A1 | | 12/2002 | Mydlack |

* cited by examiner

*Primary Examiner*—Edmund H. Lee
(74) *Attorney, Agent, or Firm*—Michael A. Catania; Elaine H. Lo

(57) ABSTRACT

A mold for casting a cover for a golf ball is disclosed herein. The mold is composed of a first mold half and a second mold half. Each mold half has an internal hemispherical cavity and a plurality of recesses in flow communication with the internal hemispherical cavity. The recesses are preferably concave on one side of the parting line and convex on the opposing side of the parting line. Preferably, the mold assembly is utilized to mold a polyurethane cover on a golf ball precursor product.

9 Claims, 7 Drawing Sheets

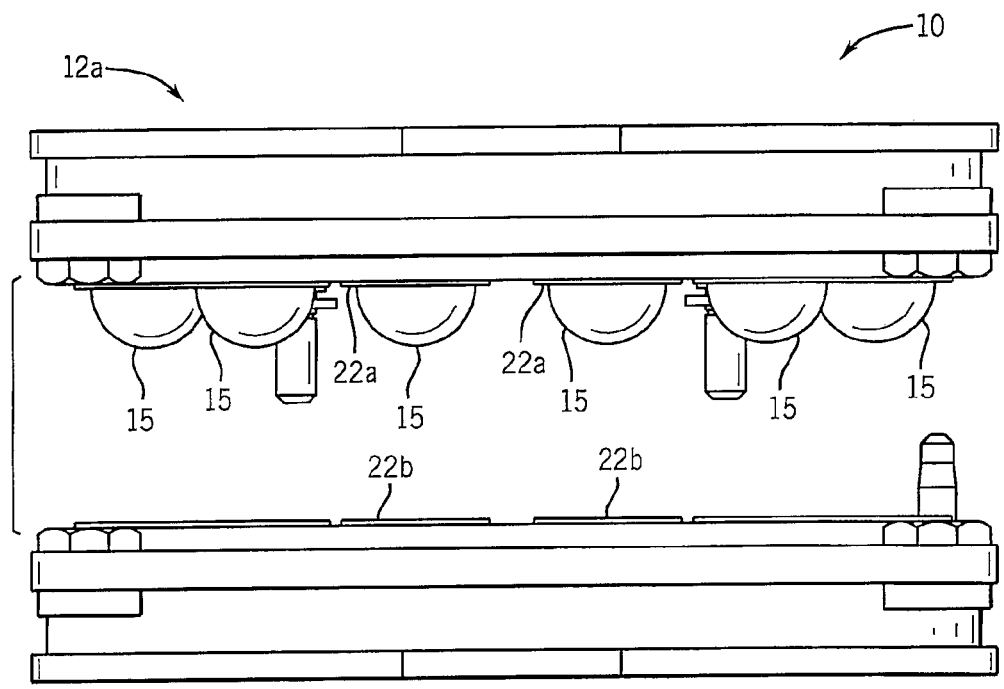
FIG. 1
FIG. 2
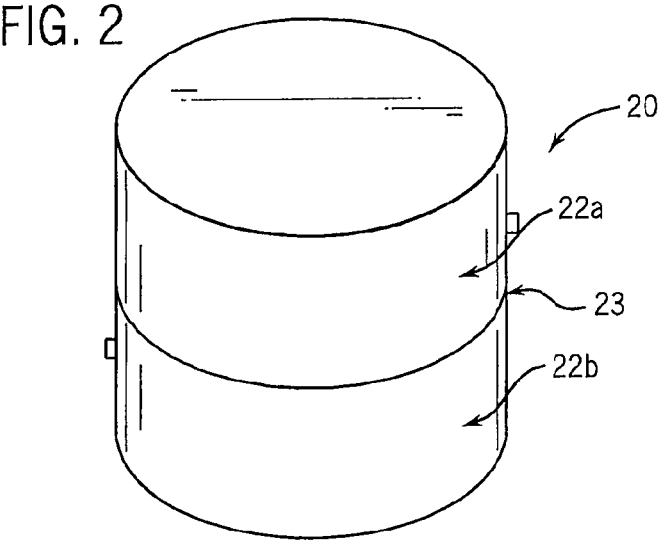

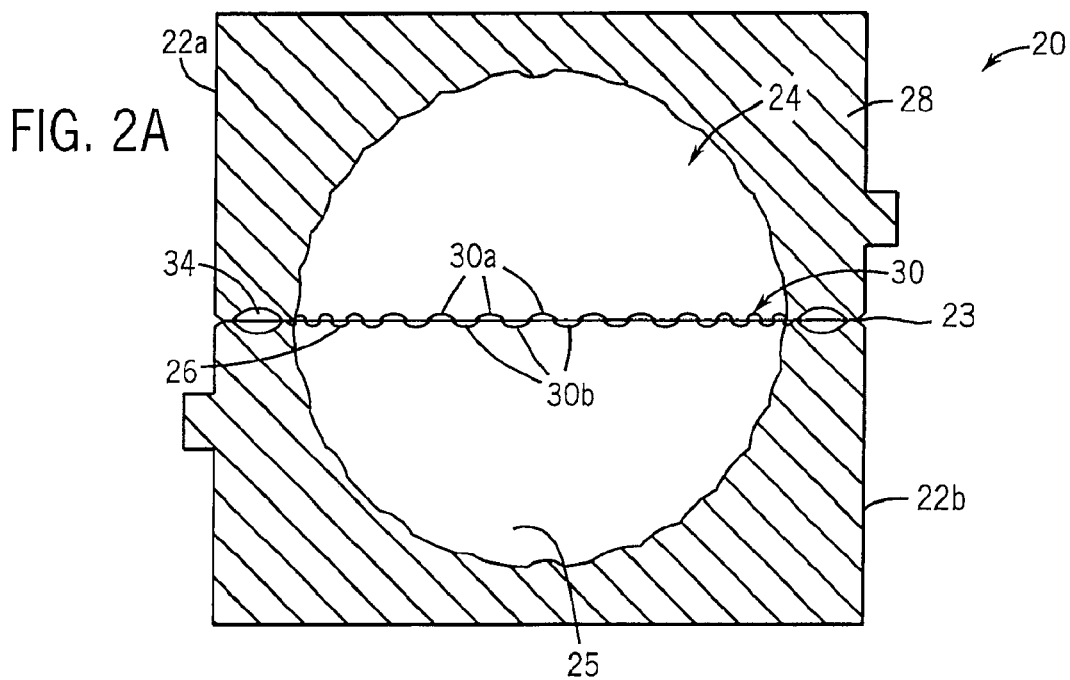
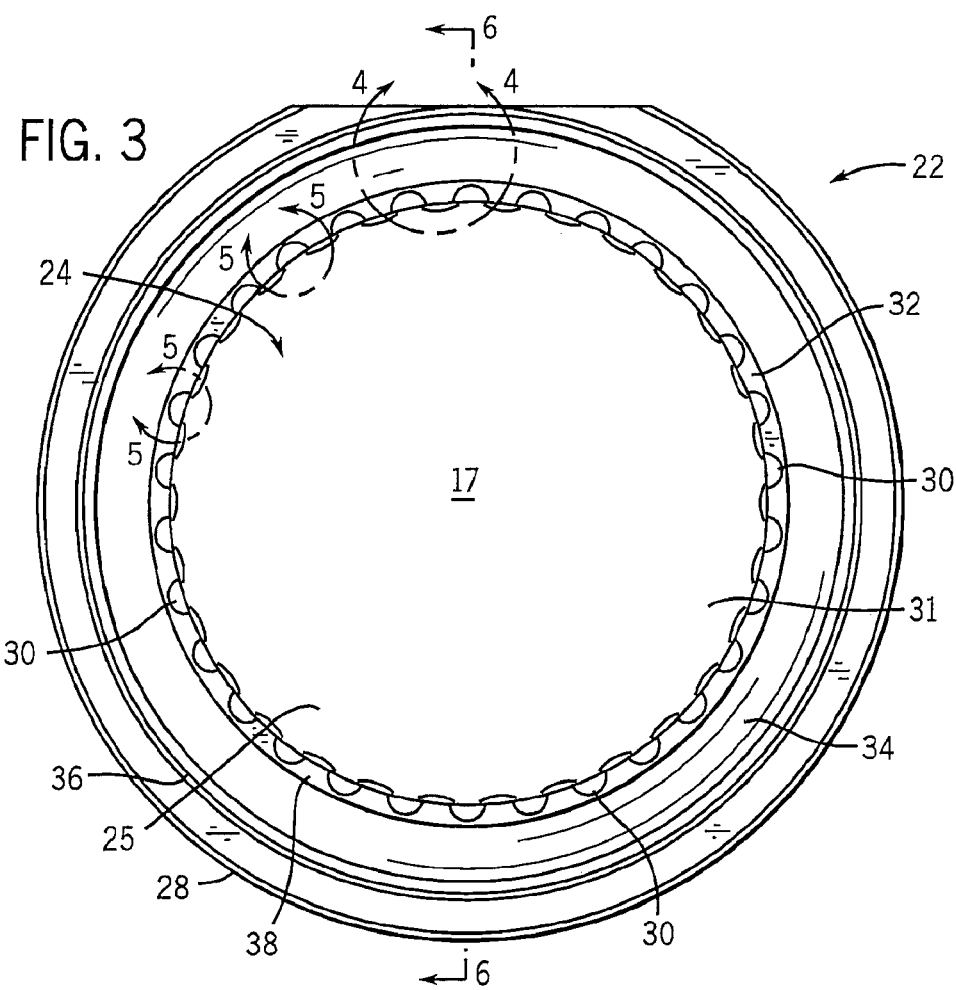

FIG. 3A
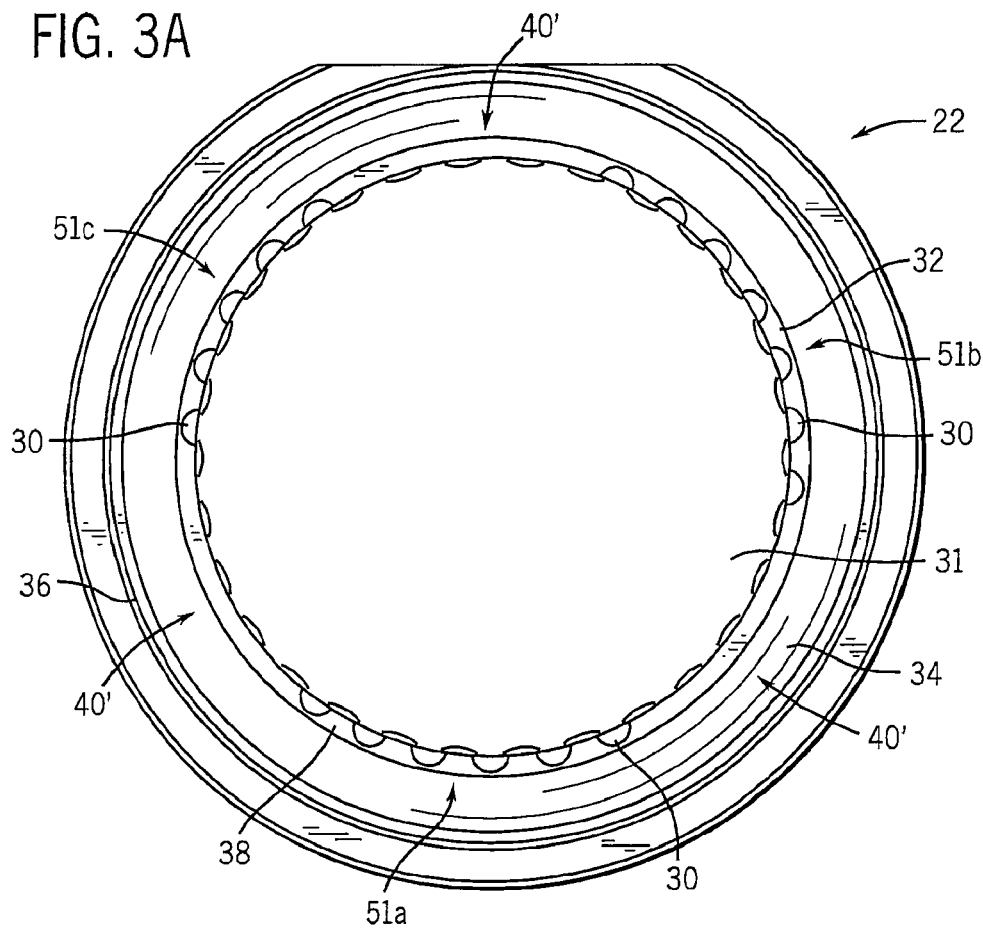
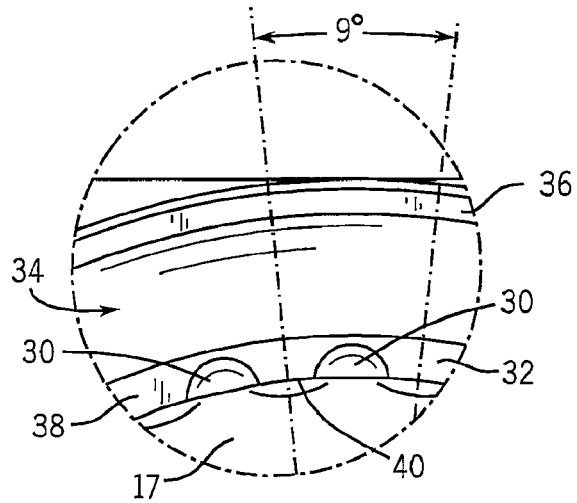
FIG. 4
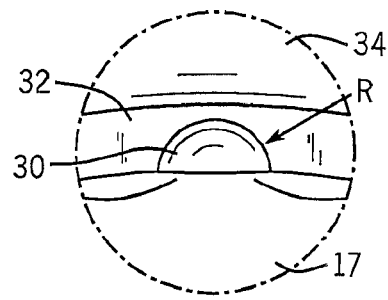
FIG. 5

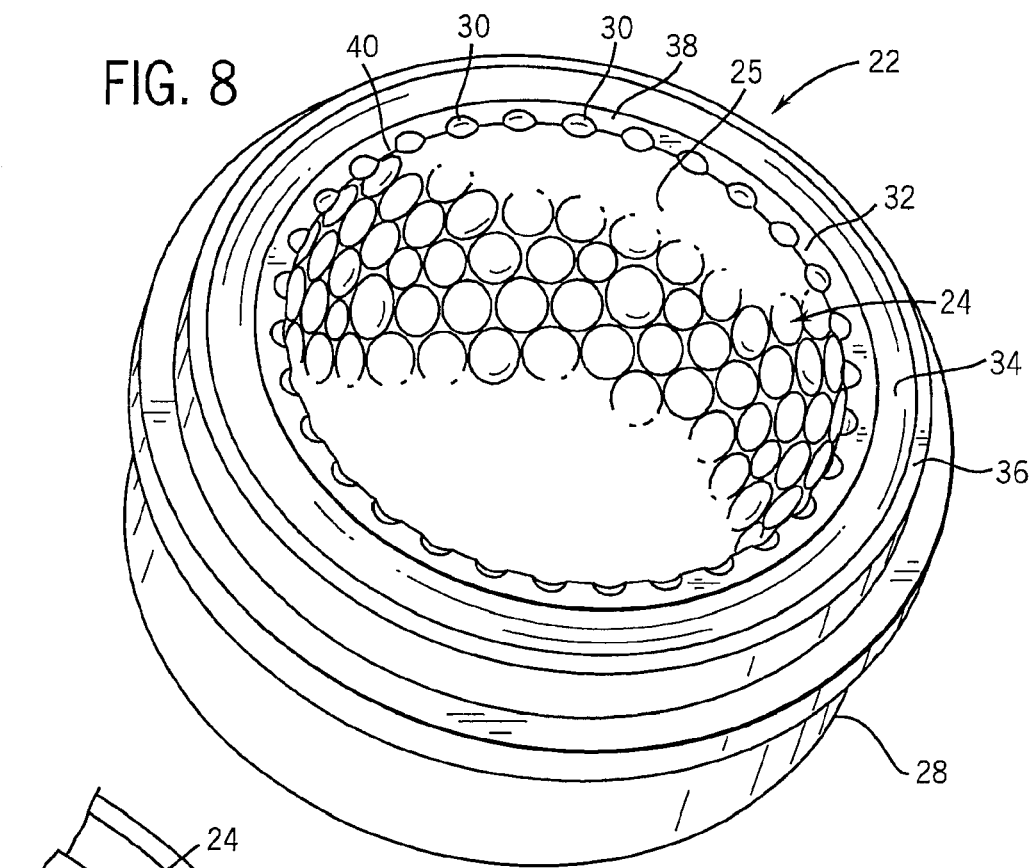
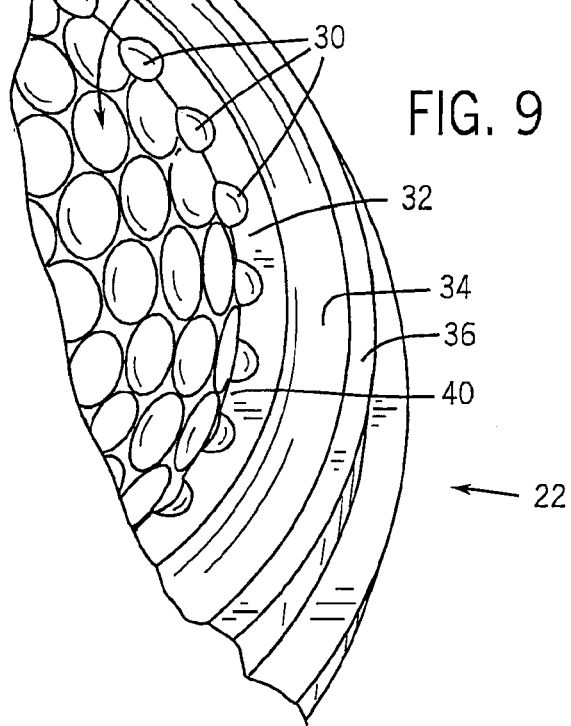

METHOD FOR CASTING A COVER ON A GOLF BALL PRECURSOR PRODUCT

CROSS REFERENCE TO RELATED APPLICATIONS

This application is a divisional application of U.S. patent application Ser. No. 09/682,753, filed on Oct. 12, 2001, now U.S. Pat. No. 6,685,455.

FEDERAL RESEARCH STATEMENT

[Federal Research Statement Paragraph]

BACKGROUND OF INVENTION

1. Field of the Invention

The present invention relates to a mold for forming a golf ball cover layer. More specifically, the present invention relates to a mold for forming a thermoset polyurethane cover for a golf ball.

2. Description of the Related Art

Golf balls may comprise one-piece constructions or they may include several layers including a core, one or more intermediate layers and an outer cover that surrounds any intermediate layer and the core. In multi-component golf balls, there exists an inner core. Often, this core is made by winding a band of elastomeric material about a spherical elastomeric or liquid-filled center. Alternatively, the core may be a unitary spherical core made of a suitable solid elastomeric material. One such material that is conventionally used for the core of golf balls is a base rubber, such as polybutadiene, which is cross-linked with a metal acrylate, such as zinc diacrylate.

In the construction of some multi-component golf balls, an intermediate boundary layer is provided outside and surrounding the core. This intermediate boundary layer is thus disposed between the core and the outer cover of the golf ball.

Located outwardly of the core and any intermediate boundary layer is a cover. The cover is typically made from any number of thermoplastic or thermosetting materials, including thermoplastic resins such as ionomeric, polyester, polyetherester or polyetheramide resins; thermoplastic or thermoset polyurethanes; natural or synthetic rubbers such as balata (natural or synthetic) or polybutadiene; or some combination of the above.

Golf balls are typically manufactured by various molding processes, whether one-component or multicomponent balls. Generally, the core of the golf ball is formed by casting, compression molding, injection molding or the like. If an intermediate boundary layer is desired, one or more intermediate boundary layers are added over the core by any number of molding operations, including casting, compression molding, and/or injection molding. The cover is then formed over the core and intermediate boundary layers, if present, through casting, compression molding, and/or injection molding.

One of the earliest disclosures of manufacturing a golf ball with dimples is set forth in U.S. Pat. No. 721,462 to Richards, which was filed on May 26, 1902. Richards discloses covering a core that is centered with pins within a spherical cavity of a mold, with a fluent gutta percha material. The gutta percha material is subjected to high pressure and then cooled within the mold to form a cover on the core.

Bowerman et al., U.S. Pat. No. 2,940,128, which was filed on May 14, 1958, discloses a method of manufacturing a rubber covered golf ball. Bowerman discloses separately forming rubber hemispherical covers on the core.

One of the earliest methods of manufacturing a polyurethane cover is disclosed in Gallagher, U.S. Pat. No. 3,034,791, which was filed on Apr. 26, 1960. Gallagher discloses forming polyurethane disks that are then molded over cores to create a polyurethane cover.

Another early method of manufacturing a polyurethane cover is disclosed in Ward, U.S. Pat. No. 3,147,324, which was filed on Oct. 20, 1960. Ward discloses using a liquid polyurethane prepolymer, either polyether-type or polyester-type, that is cured with a diamine. The liquid polyurethane is poured into a hemispherical mold cavity of a mold half, and a wound golf ball core is centered therein. Subsequently, a corresponding hemispherical mold cavity of a second mold half is filled with the liquid polyurethane. The first mold half with the wound core is then mated with the second mold half and allowed to cure for a set period of time.

A second Ward patent directed toward forming a polyurethane cover is U.S. Pat. No. 3,112,521, which was filed on Mar. 8, 1961. The '521 Ward patent discloses a method and apparatus for sensing the center of a wound core prior to placement in a mold filled with liquid polyurethane which is part of a complete casting machine. As with the '324 Ward patent, liquid polyurethane is poured into a hemispherical mold cavity of a mold half. However, in the '521 Ward patent, the wound core is more precisely centered prior to insertion into the polyurethane filled cavity. The entire process of the '521 Ward patent is performed on a rotatable annular platform.

Another example of a method for making a polyurethane cover is disclosed in Watson et al., U.S. Pat. No. 3,130,102, filed originally in Great Britain on May 19, 1960. Watson discloses a process for partially forming polyurethane half-shells for a golf ball, cooling them, then fusing them together on a core while imparting a dimple pattern thereon. Watson also demonstrates better cutting resistance for its polyurethane covered golf ball. An alternative of the Watson process for making a polyurethane cover on a golf ball is disclosed in a related patent to Ford et al., U.S. Pat. No. 3,177,280, filed originally in Great Britain on May 23, 1960. Ford discloses coating a core until the required thickness is applied, however, it still requires interrupting the curing, to place the coated core into a mold to impart a dimple pattern thereon.

Building upon Ford and Watson, U.S. Pat. No. 3,989,568 to Isaac discloses a process for using curing agents that have different reaction rates to partially cure a polyurethane half shell that is later placed on a core for further processing. Isaac discloses that a cover may be as thin as 0.025 inches using this process which involves two different diisocyanates and different amine curing agents. Dusbiber, U.S. Pat. No. 3,979,126, originally filed in February of 1965, discloses another method of making polyurethane half shells for a golf ball cover.

Brown et al., U.S. Pat. No. 5,006,297, filed on Feb. 22, 1989, discloses openly curing both halves of polyurethane cover in an initial mold, then compression molding the smooth covered golf ball to form a dimple pattern thereon. The initial molding step may use retractable or non-retractable pins to center the wound core while polyurethane flows about it.

Wu, U.S. Pat. No. 5,334,673 discloses the multiple step process of Ford and Watson using a slow-reacting polyamine curing agent. Wu et al., U.S. Pat. No. 5,692,974 discloses the difficulty in manufacturing a commercially viable polyurethane covered golf ball due to the centering of the core within a partially cured mixture of polyurethane. The '974 Wu patent states that the 1993 Titleist®PROFESSIONAL was the first successful polyurethane covered golf ball.

Calabria et al., U.S. Pat. Nos. 5,733,428; 5,888,437; 5,897,884; and 5,947,843 all originate from an application filed on Jan. 21, 1994 which was a continuation-in-part application of an abandoned application filed on Jul. 6, 1992. The Calabria family of patents disclose a method and apparatus for forming a wound core golf ball with a polyurethane cover. The apparatus of Calabria, similar to that of the '521 Ward patent, inserts a wound core into a half mold cavity of partially cured polyurethane. Calabria discloses using a single insertion device for each individual mold. Calabria introduces the polyurethane mixture into a top mold half and after 50 to 80 seconds later a core is lowered at a controlled rate to prevent air bubbles, and a stop limits the downward movement of the core into the mold cavity. At a later time the bottom mold halves are filled with the polyurethane mixture. After another 50 to 80 seconds, the vacuum holding the core is released and mold halves are removed from the centering fixture. The top mold halves are then mated with the bottom mold halves and excess material resides in sprue channels. The mold halves are heated and pressurized for a predetermined period of time, and then demolded.

Herbert et al., U.S. Pat. No. 5,885,172, which was filed on May 27, 1997, discloses using the process of Calabria to form a polyurethane cover over a core with an inner layer thereon. Wu, U.S. Pat. No. 5,908,358, which was originally filed on Jun. 7, 1995, discloses using a four mold unit to manufacture golf balls with polyurethane covers.

Dewanjee, et al., PCT International Publication Number WO 99/43394, claiming priority from U.S. patent application Ser. No. 09/030,332, filed on Feb. 25, 1998 discloses a method for forming a polyurethane cover on a golf ball. Dewanjee discloses using a X-Y table to position mold halves under a mix head that dispenses the polyurethane mixture. The mold halves are then placed on a conveyor for transport to a core insertion station. The cores are then centered over each cavity through use of a pin on the mold half that engages with an aperture on the core holding unit. A second mold half is mated with the first mold half, and the mold is heated under pressure to form a polyurethane cover over the core. De-molding is accomplished through insertion of mold releasing pins into apertures of the mold halves.

In most any casting or molding process, a flash ring—or what resembles a "Saturn ring" appears where the cavities join and the excess material spills over into a trough. This allows for escape of the excess material during the casting process, and ensures consistent thickness. What results is a cast golf ball cover with a small flash ring or seam around the circumference. The seam is then buffed away, and the ball is finished or painted, making the line nearly imperceptible. However, the continuous line does cause the dimples to be slightly farther apart at the equator, which can affect the golf ball"s aerodynamics.

Thus, there remains a need for a casting mold that will minimize the flash ring and allow for the dimples to be positioned closer across the equator of the golf ball.

SUMMARY OF INVENTION

The casting mold of the present invention is able to provide a solution to the problems of the prior art. The present invention is able to accomplish this by providing a novel mold that allows for a tab ring to be formed around an unfinished golf ball during the casting process.

One aspect of the present invention is a mold for a casting a cover for a golf ball. The mold has a first mold half including a body having a wall and a perimeter perpendicular to the wall. The body has an internal hemispherical cavity. The perimeter has a plurality of recesses, and each of the plurality of recesses is in flow communication with the internal hemispherical cavity. Each of the plurality of recesses is separated from an adjacent recess by a land area of the perimeter. The mold also has a second mold half that has a body having a wall and a perimeter perpendicular to the wall. The body has an internal hemispherical cavity, and the perimeter has a plurality of recesses. Each of the plurality of recesses is in flow communication with the internal hemispherical cavity, and each is separated from an adjacent recess by a land area of the perimeter. Each of the plurality of recesses has a first end and a second end opposite the first end along a circumference of the internal hemispherical cavity. Each of the plurality of recesses of the first mold half oppose land area of the perimeter of the second mold half and each of the plurality of recesses of the second mold half oppose the land area of the perimeter of the first mold half when the first mold half is mated to the second mold. Each of the plurality of recesses of the first mold half have a first end that overlaps a first end of a recess of the plurality of recesses of the second mold half, and each of the plurality of recesses of the second mold has a second end that overlaps a second end of a recess of the plurality of recesses of the first mold half when the first mold half is mated to the second mold half.

Each of the plurality of recesses of the first mold half may have a concave opening to the internal hemispherical cavity and each of the plurality of recesses of the second mold half may have a convex opening to the internal hemispherical cavity. The internal hemispherical cavity may have a radius of 0.84 inch. The perimeter of the first mold half preferably has from 20 to 40 recesses, and the perimeter of the second mold half preferably has from 20 to 40 recesses. The perimeter of the first mold half preferably has 30 recesses, and the perimeter of the second mold half preferably has 30 recesses. Each of the plurality of recesses of the perimeter of the first mold half preferably has a depth from the perimeter ranging from 0.010 inch to 0.040 inch, and each of the plurality of recesses of the perimeter of the second mold half preferably has a depth from the perimeter ranging from 0.010 inch to 0.040 inch. The perimeter of the first mold half preferably has a 360 degrees surface and the perimeter preferably has a recess between intervals of 9 degrees of the 360 degrees surface, and the perimeter of the second mold half preferably has a 360 degrees surface and the perimeter preferably has a recess between intervals of 9 degrees of the 360 degrees surface. Each of the plurality of recesses of the perimeter of the first mold half preferably has a length from the internal hemispherical cavity towards the end of the perimeter ranging from 0.010 inch to 0.040 inch, and each of the plurality of recesses of the perimeter of the second mold half preferably has a length from the internal hemispherical cavity towards the end of the perimeter ranging from 0.010 inch to 0.040 inch. The mold is without gates.

Another aspect of the present invention is a mold for a casting a cover for a golf ball. The mold has a cylindrical body having an internal surface that defines a spherical cavity. The spherical cavity has a diameter ranging from 1.62 inches to 1.75 inches. The internal surface has an inverse pattern for a surface geometry of a golf ball. The cylindrical body has a trough for excess material during casting, which includes a first plurality of recesses with convex openings to the spherical cavity and a second plurality of recesses with concave openings to the spherical cavity. All of the first plurality of recesses are on one side of a parting line of the mold and all of the second plurality of recesses are on an opposing side of the parting line of the mold.

Yet another aspect of the present invention is a method for casting a cover on a golf ball precursor product. The method includes dispensing a liquid thermosetting polyurethane prepolymer in a first mold half. Next, a golf ball precursor product is placed in the first mold half. Next, the first mold half is mated with a second mold half. Next, a cover is formed on the golf ball precursor product, and the cover has a continuous tab.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF DRAWINGS

FIG. 1 is a side view of a mold assembly for use with a mold of the present invention.

FIG. 2 is a top perspective view of a mold of the present invention.

FIG. 2A is a cross-sectional view of a mold of the present invention.

FIG. 3 is a top plan view of a mold half of the present invention.

FIG. 3A is a top plan view of an alternative mold half of the present invention.

FIG. 4 is an enlarged view of circle 4 of FIG. 3.

FIG. 5 is an enlarged view of circle 5 of FIG. 3.

FIG. 8 is a top perspective view of an empty mold half of the present invention.

FIG. 9 is an enlarged view of a portion of an empty mold half of the present invention.

DETAILED DESCRIPTION

Figure 6:
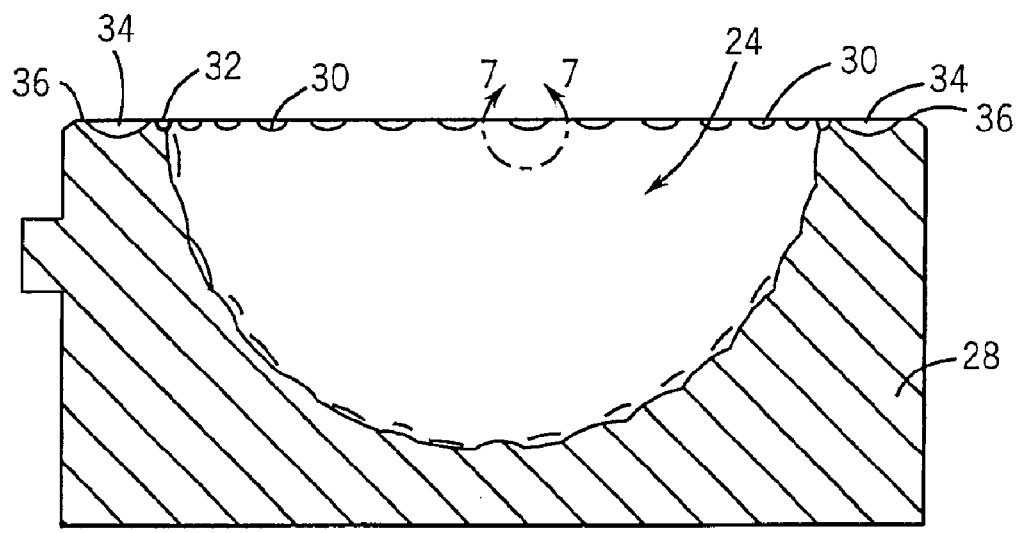
FIG. 6 is a cross-sectional view of the mold half along line 6—6 of FIG. 3.
Figure 7:
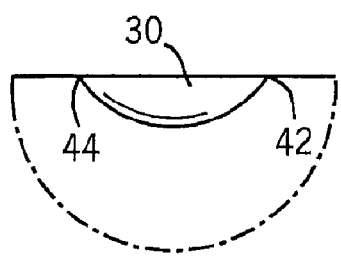
FIG. 7 is an enlarged view of circle 7 of FIG. 6.

As shown in FIG. 1, a mold assembly for simultaneously casting covers over multiple golf ball precursor products 15 is generally designated 10, and is composed of an upper assembly 12a and a lower assembly 22b. As shown in FIG. 2, a mold 20, is composed of two mold halves 22a and 22b which are mated at a parting line 23. The parting line 23 corresponds to the equator of the golf ball being formed in the mold 20. During the cast molding process, a predetermined quantity of flowable material, such as a liquid thermosetting polyurethane prepolymer, is dispensed into each mold half 22a–b, and allowed to partially gel. Then, a golf ball precursor product 15 is placed within one mold half 22a and the mold halves 22a–b are mated to cast a cover over the golf ball precursor product 15. The mold 20 is sealed (unlike an injection mold where gates allow material to be injected into the mold) and the flowable material is allowed to cure. Such a casting process is set forth in U.S. Pat. No. 6,395,218, entitled System And Method For Cast Molding A Golf Ball, which is hereby incorporated in its entirety by reference.

As shown in FIG. 2A, the mold 20 has a generally cylindrical body 28 and a spherical cavity 24 that is defined by the internal surface 25 of the mold 20. Typically, the internal surface 25 will have an inverse pattern of a surface geometry for a golf ball. The mold 20 also has a trough 26, located at the parting line 23, for collection of excess flowable material during the casting process. The trough 26 is composed of a first plurality of recesses 30a of the first mold half 22a and a second plurality of recesses 30b of the second mold half 22b. The plurality of recesses 30a and 30b will be further described below.

As shown in FIGS. 3–9, a mold half is generally designated 22, and the mold half 22 may be the first mold half 22a or second mold half 22b. The mold half 22 has a body 28 with an internal hemispherical cavity 24 that is defined by the internal surface 25 of the body 28. The body 28 of the mold half 22 has a thickness that increases from top to bottom due to the curvature of the internal hemispherical cavity 24. The surface 25 of the internal hemispherical cavity 24 has an inverse pattern for imparting a desired pattern onto a golf ball. The internal hemispherical cavity 24 has a radius that corresponds to the radius of a golf ball. The radius preferably ranges from 0.90 inch to 0.80 inch, more preferably from 0.81 inch to 0.85 inch, and most preferably 0.84 inch. At an opening 31 of the internal cavity 24 is a perimeter 32, which forms a ring 360 degrees about the circumference of the internal hemispherical cavity 24. Surrounding the perimeter is an annular groove 34 for securing to the two mold halves 22 to one another during mating of the mold halves 22. Surrounding the annular groove 34 is an outer wall 36 of the mold half 22. The perimeter 32 has a thickness that preferably ranges from 0.040 inch to 0.070 inch.

The perimeter 32 has a top surface 38 with the plurality of recesses 30 and land area 40. Each recess 30 is adjacent to land area 40. In a preferred embodiment, the perimeter 32 of each mold half 22 has twenty to forty recesses 30, and most preferably thirty recesses 30. As shown in FIG. 4, the recesses 30 are preferably positioned between intervals of nine degrees in the top surface 38 of the perimeter 32. In a preferred embodiment with thirty recesses 30, the center of each recess 30 is located at intervals of twelve degrees around the 360 degrees top surface 38 of the perimeter 32.

As shown in FIG. 5, each recess 30 has a radius preferably ranging from 0.020 inch to 0.060 inch, and most preferably 0.05 inch. The radius is measured for the opening of the recess 30 on the top surface 38 as opposed to the opening of the recess 30 into the internal hemispherical cavity 24. The opening of each recess 30 on the top surface 30 is preferably hemispherical, or substantially hemispherical. Each recess 30 has a first end 42 and an opposing second end 44. When the mold halves 22 are mated, as shown in FIG. 2, each of the first plurality of recesses 30a of the first mold half 22a are offset from each of the second plurality of recesses 30b of the second mold half 22b. However, the first end 42 of each of the first plurality of recesses 30a of the first mold half 22a will overlap a first end 42 of an adjacent and offset recess 30b of the second plurality of recesses 30b of the second mold half 22b, and the second end 44 of each of the first plurality of recesses 30a of the first mold half 22a will overlap a second end 44 of an adjacent and offset recess 30b of the second plurality of recesses 30b of the second mold half 22b. Thus, a continuous flow of the flowable material through all of the plurality of recesses 30 is accomplished by the overlapping of adjacent and offset recesses 30. As explained in greater detail below, this allows for a continuous tab to be formed around the equator of the golf ball 17 to facilitate seam buffing of the unfinished golf ball 17.

In an alternative embodiment illustrated in FIG. 3A, the plurality of recesses 30 are positioned in sets 51a, 51b and 51c with large land areas 40" between the sets. In this embodiment, the first plurality of recesses 30a and the second plurality of recesses 30b are only disposed around preferably 20% to 80% of the circumference of the perimeter 32, more preferably around 40% to 60% of the circumference of the perimeter 32, and most preferably around 50% of the perimeter 32. Also, in this embodiment, tabs are only formed around preferably 20% to 80% of the circumference of the unfinished golf ball 17, more preferably the tabs are formed around 40% to 60% of the circumference of the unfinished golf ball 17, and most preferably tabs are formed around 50% of the unfinished golf ball 17. However, those skilled in the pertinent art will recognize that tabs may be formed around other percentages of the circumference of the unfinished golf ball without departing from the scope and content of the present invention.

In cast molding, a thermoset material in a semi liquid or liquid form is placed into each of the mold halves 22a and 22b, and allowed to partially gel or cure. Then, a golf ball precursor product 15 is placed in the first mold half 22a. The golf ball precursor product 15 may be a core, a core with windings, a core with a boundary layer, or the like. After the golf ball precursor product 15 is inserted into the first mold half 22a, the second mold half 22a, with the thermoset material therein, is mated with the first mold half 22a to from the complete mold 20 as shown in FIG. 2A. The mold 20 is then cured through heating and/or pressure in order to form a cover with a continuous tab 70 on a golf ball 17. For the formation of multiple golf balls, as shown in FIG. 1, a set of golf ball precursor products 15 are placed within the upper assembly 12a which is inverted for mating with the lower assembly 12b. The golf ball precursor products 15 may be a core (solid, liquid or hollow) that is wound or non-wound. Each golf ball precursor product 15 may also have one or more intermediate or boundary layers over the core portion. The thermoset material layer that is casted in the mold assembly 10 is the cover layer of the golf ball 17, and it will have a surface geometry thereon. An example of such a surface geometry is set forth in U.S. Pat. No. 6,213,898, which is hereby incorporated by reference in its entirety. A preferred thermoset material is polyurethane such as described in U.S. Pat. No. 6,190,268, entitled Golf Ball With A Polyurethane Cover, which pertinent parts are hereby incorporated by reference. However, those skilled in the relevant art will recognize that other materials may be used with the present invention without departing from the scope and spirit of the present invention.

Figure 10:
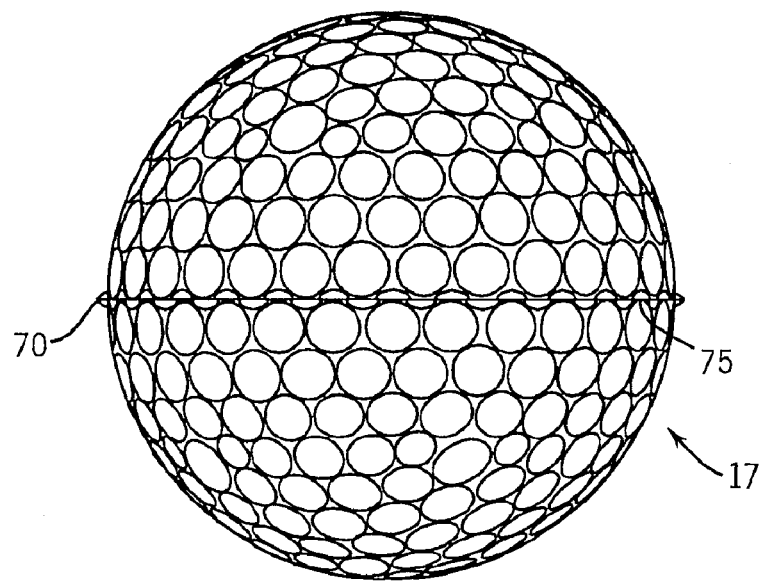
FIG. 10 is an equatorial view of an unfinished golf ball with a continuous tab formed using the mold of the present invention.
Figure 11:
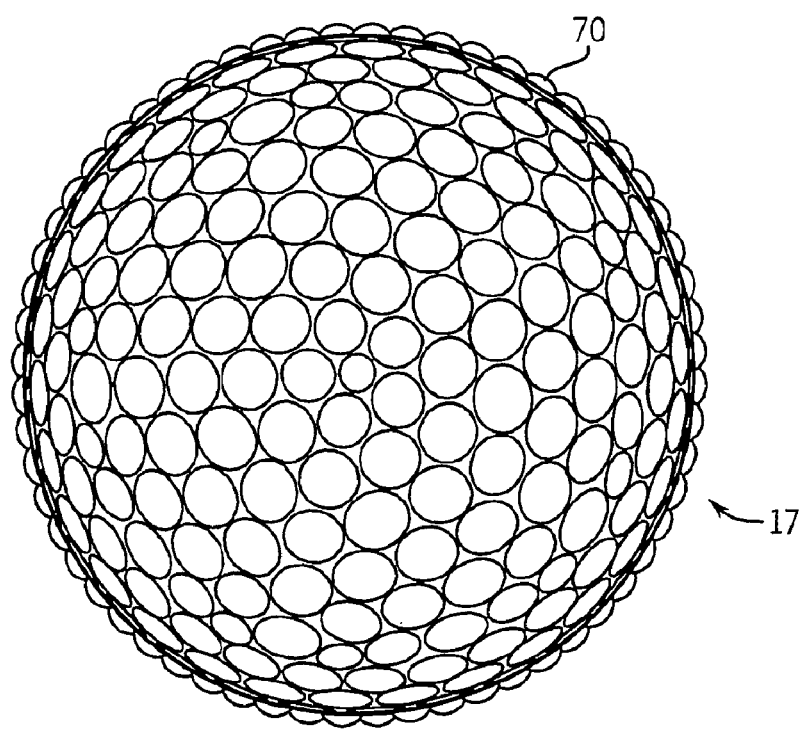
FIG. 11 is a top plan view of an unfinished golf ball with a continuous tab formed using the mold of the present invention.
Figure 12:
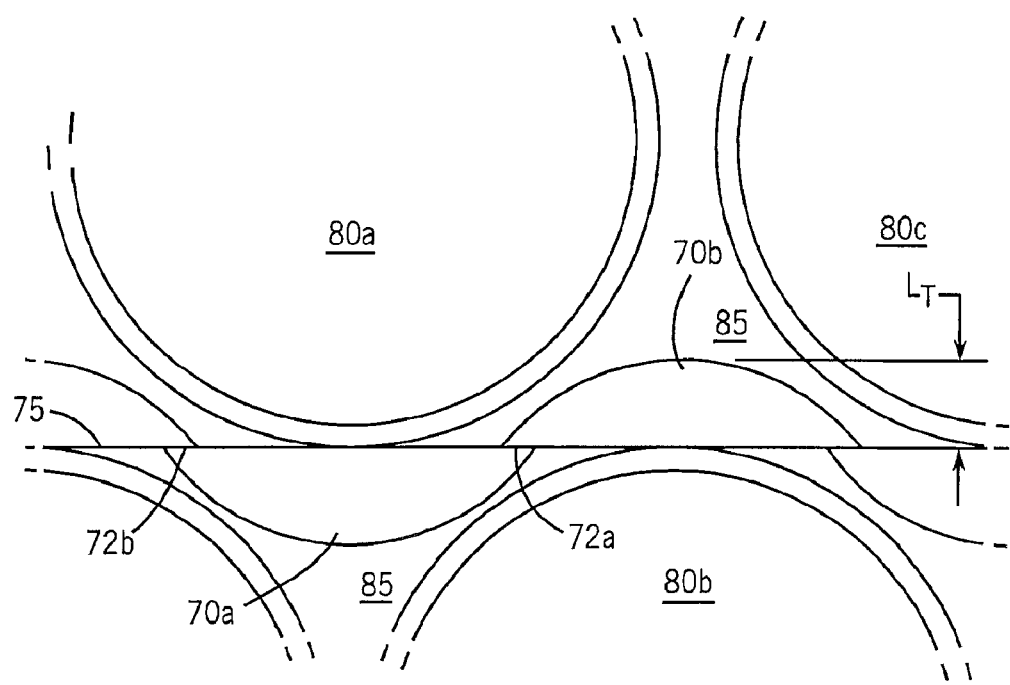
FIG. 12 is an enlarged equatorial view of the equator of an unfinished golf ball with a continuous tab formed using the mold of the present invention.

As shown in FIGS. 10–12, the unfinished golf ball 17 has the continuous tab 70 about the equator 75 of the golf ball 17. As used herein, the term "unfinished golf ball" is defined as a golf ball that has yet to be seam buffed to remove the extra material during the cover formation, and one that has not been painted/coated and marked with an indicia, such as "RULE 35" to indicate the source of the golf ball. As shown in FIG. 12, the continuous tab 70 is composed of a plurality of convex tabs 70a and concave tabs 70b that alternate around the circumference of the golf ball 17. Each convex tab 70a is adjacent a concave tab 70b, and each convex tab 70a overlaps the adjacent concave tabs 70b at a first overlap section 72a and a second overlap section 72b. The plurality of convex tabs 70a are formed by the second plurality of recesses 30b of the second mold 22b, and the plurality of concave tabs 70b are formed by the first plurality of recesses 30a of the first mold 22a. This alternating tab formation allows for the dimples 80 (dimples 80a, 80b and 80c are shown in FIG. 12 for illustrative purposes) to be positioned closer to the equator 75 of the golf ball 17 which promote greater symmetry of the finished golf ball and gives the finished golf ball better and more consistent performance. The tabs 70a and 70b are placed with land area 85 of the golf ball 17. The distance, "Lt" from the equator 75 to the height of the tab 70b preferably ranges from 0.015 inch to 0.40 inch, and is most preferably 0.025 inch. If the tab was not alternating, as in the prior art, then the dimples would have to be positioned this distance, Lt, from the equator 75 thereby creating a wider seam in the golf ball. The present invention allows for the dimples to be positioned closer to the equator 75 thereby creating a smaller seam on the finished golf ball.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method for casting a cover on a golf ball precursor product, the method comprising:

dispensing a liquid thermosetting polyurethane prepolymer in a first mold half, the first mold half comprising a body having a wall and a perimeter perpendicular to the wall, the body having an internal hemispherical cavity, the perimeter having a plurality of recesses, each of the plurality of recesses in flow communication with the internal hemispherical cavity, each of the plurality of recesses separated from an adjacent recess by a land area of the perimeter;

placing a golf ball precursor product into the liquid thermosetting polyurethane prepolymer dispensed in the first mold half;

dispensing the liquid thermosetting polyurethane prepolymer in a second mold half, the second mold half comprising a body having a wall and a perimeter perpendicular to the wall, the body having an internal hemispherical cavity, the perimeter having a plurality of recesses, each of the plurality of recesses in flow communication with the internal hemispherical cavity, each of the plurality of recesses separated from an adjacent recess by a land area of the perimeter and each of the plurality of recesses having a first end and a second end opposite the first end along a circumference of the internal hemispherical cavity, wherein each of the plurality of recesses of the first mold half oppose land area of the perimeter of the second mold half and each of the plurality of recesses of the second mold half oppose the land area of the perimeter of the first mold half when the first mold half is mated to the second mold half, and each of the plurality of recesses of the first mold half having a first end that overlaps a first end of a recess of the plurality of recesses of the second mold half, and each of the plurality of recesses of the second mold half having a second end that overlaps a second end of a recess of the plurality of recesses of the first mold half when the first mold half is mated to the second mold half;

mating the first mold half having the liquid thermosetting polyurethane prepolymer and the golf ball precursor therein with the second mold half having the liquid thermosetting polyurethane prepolymer therein;

forming within the mated first and second mold halves a cover on the golf ball precursor product with a continuous tab.

2. The method according to claim 1 wherein each of the plurality of recesses of the first mold half has a concave opening to the internal hemispherical cavity and each of the plurality of recesses of the second mold half has a convex opening to the internal hemispherical cavity.

3. The method according to claim 1 wherein the internal hemispherical cavity of the first mold half and the second mold half has a radius of 0.84 inch.

4. The method according to claim 1 wherein the perimeter of the first mold half has from 20 to 40 recesses, and the perimeter of the second mold half has from 20 to 40 recesses.

5. The method according to claim 1 wherein the perimeter of the first mold half has from 30 recesses, and the perimeter of the second mold half has 30 recesses.

6. The method according to claim 1 wherein each of the plurality of recesses of the perimeter of the first mold half has a depth from the perimeter ranging from 0.010 inch to 0.040 inch, and each of the plurality of recesses of the perimeter of the second mold half has a depth from the perimeter ranging from 0.010 inch to 0.040 inch.

7. The method according to claim 1 wherein the perimeter of the first mold half has a 360 degrees surface and the perimeter has a recess between 9 degrees intervals of the 360 degrees surface, and the perimeter of the second mold half has a 360 degrees surface and the perimeter has a recess between 9 degrees intervals of the 360 degrees surface.

8. The method according to claim 1 wherein each of the plurality of recesses of the perimeter of the first mold half has a length from the internal hemispherical cavity towards the end of the perimeter ranging from 0.010 inch to 0.040 inch, and each of the plurality of recesses of the perimeter of the second mold half has a length from the internal hemispherical cavity towards the end of the perimeter ranging from 0.010 inch to 0.040 inch.

9. The method according to claim 1 wherein the first and second mold halves are without gates.

* * * * *